United States Patent
Okojie et al.

(10) Patent No.: US 6,647,809 B1
(45) Date of Patent: Nov. 18, 2003

(54) SILICON CARBIDE HIGH TEMPERATURE ANEMOMETER AND METHOD FOR ASSEMBLING THE SAME

(75) Inventors: Robert S. Okojie, Strongsville, OH (US); Gustave C. Fralick, Middleburg Heights, OH (US); George J. Saad, Atwater, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/233,182

(22) Filed: Aug. 29, 2002

(51) Int. Cl.[7] .................................................. G01P 5/06
(52) U.S. Cl. ................................. 73/861.85; 73/204.11; 73/204.22; 338/25; 338/28
(58) Field of Search ........................... 73/861.85, 202.5, 73/204.11, 204.22, 204.25, 204.26; 338/25, 28; 438/51, 53, 107, 455, 456

(56) References Cited

U.S. PATENT DOCUMENTS 6,258,263 B1 * 7/2001 Henderson et al. ...... 210/198.2
6,378,365 B1 * 4/2002 Tu .......................... 73/204.26

* cited by examiner

Primary Examiner—Edward Lefkowitz
Assistant Examiner—Corey D. Mack
(74) Attorney, Agent, or Firm—Kent N. Stone

(57) ABSTRACT

A high temperature anemometer includes a pair of substrates. One of the substrates has a plurality of electrodes on a facing surface, while the other of the substrates has a sensor cavity on a facing surface. A sensor is received in the sensor cavity, wherein the sensor has a plurality of bondpads, and wherein the bond pads contact the plurality of electrodes when the facing surfaces are mated with one another. The anemometer further includes a plurality of plug-in pins, wherein the substrate with the cavity has a plurality of trenches with each one receiving a plurality of plug-in pins. The plurality of plug-in pins contact the plurality of electrodes when the substrates are mated with one another. The sensor cavity is at an end of one of the substrates such that the sensor partially extends from the substrate. The sensor and the substrates are preferably made of silicon carbide.

15 Claims, 5 Drawing Sheets

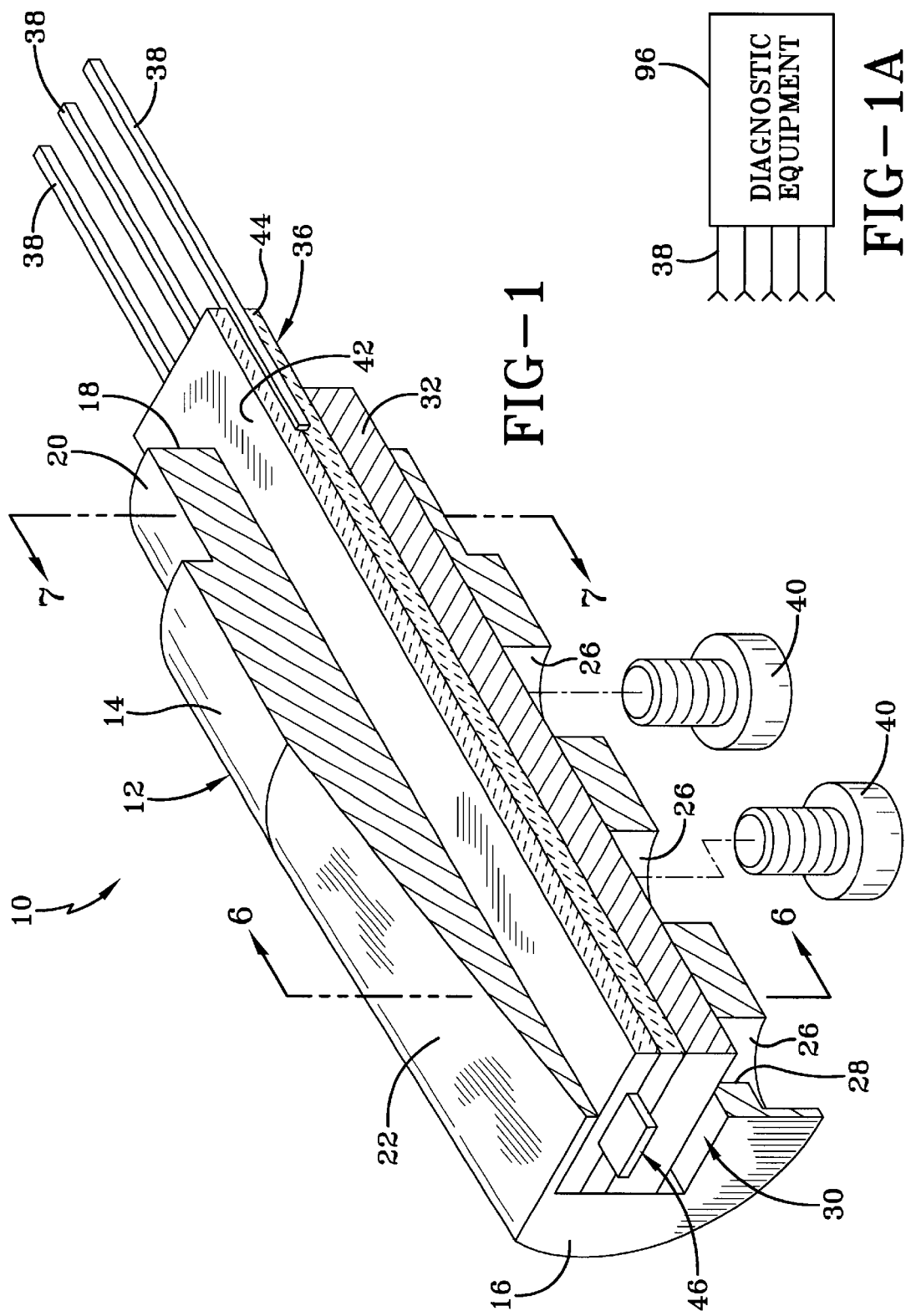

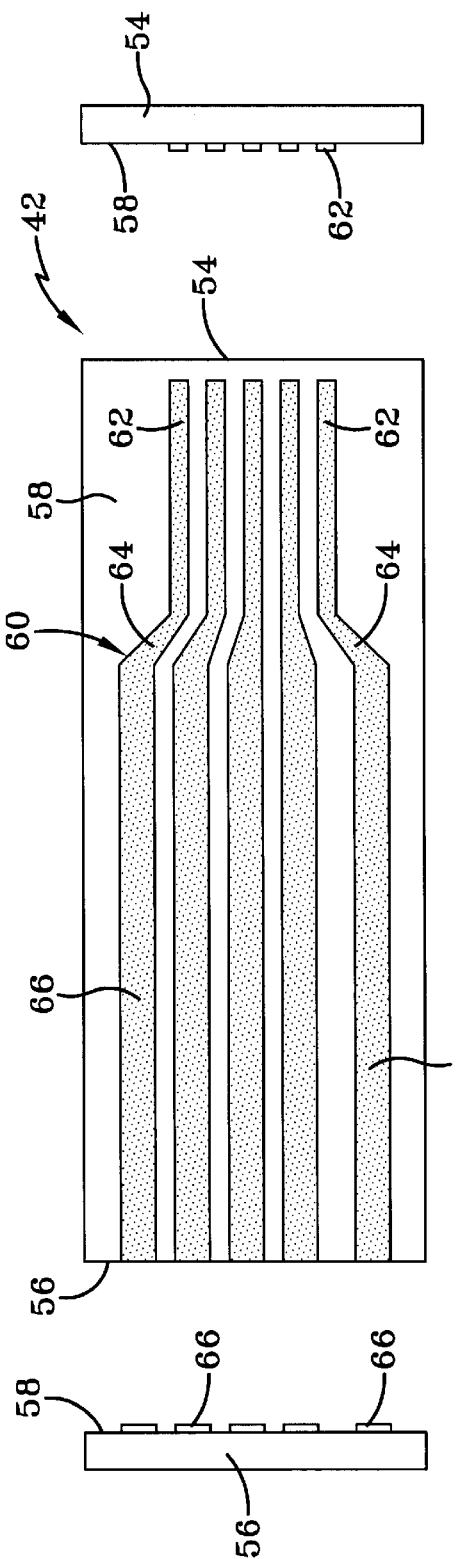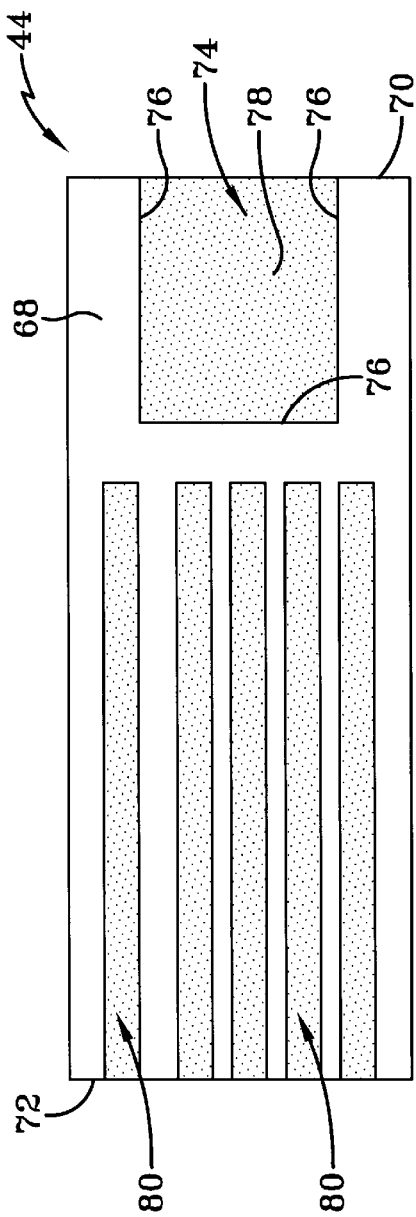

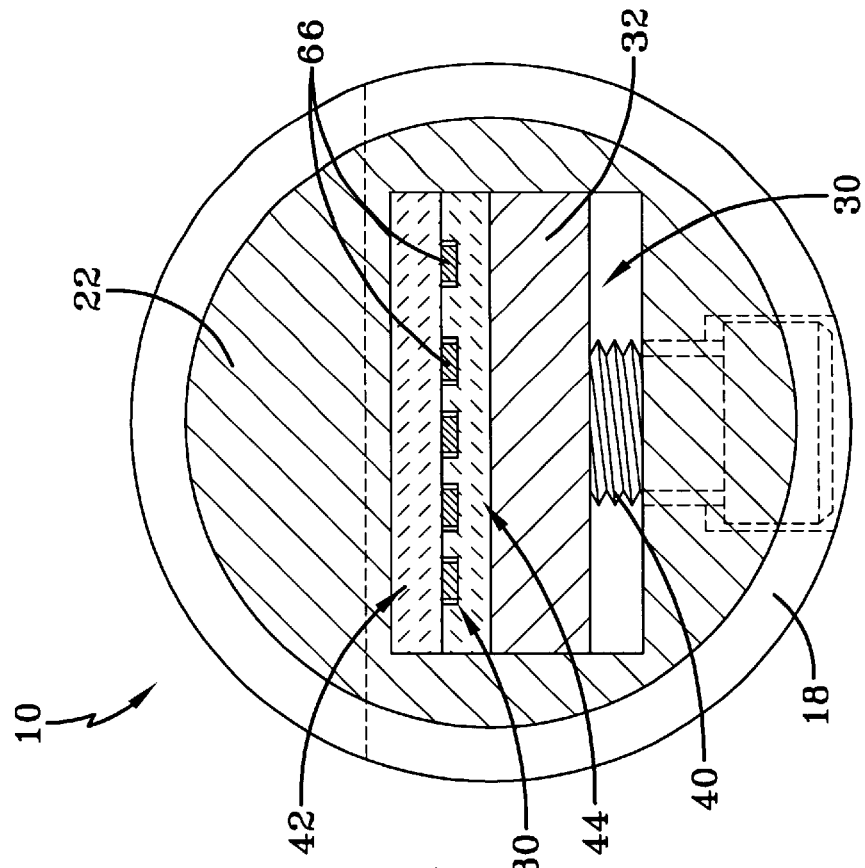
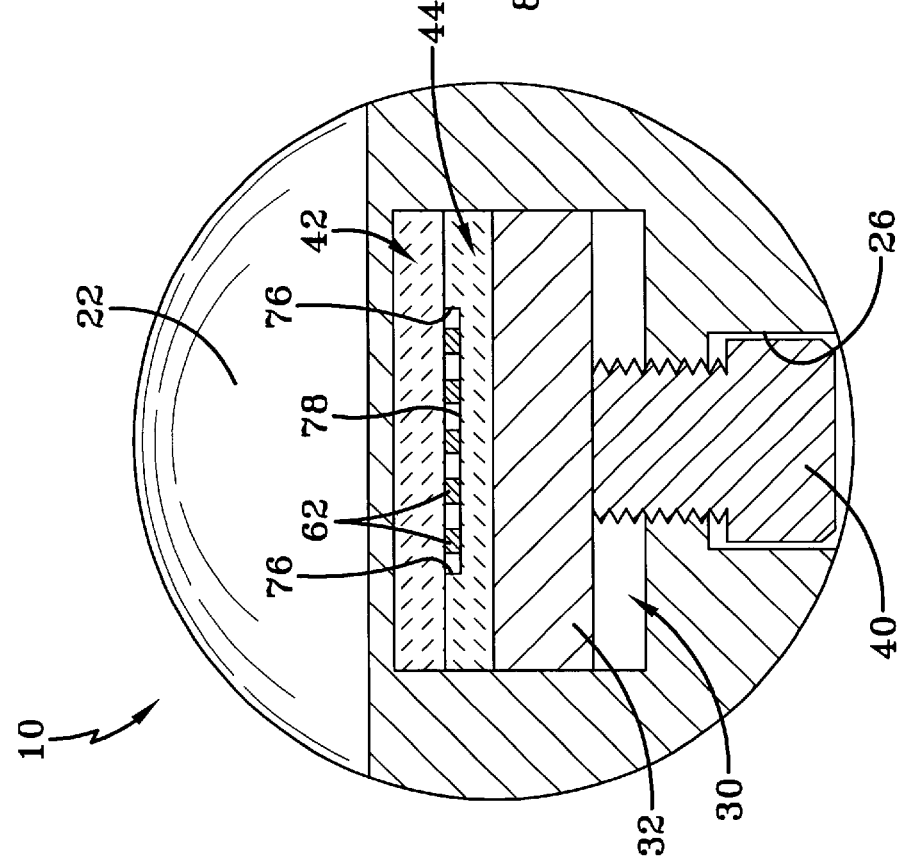

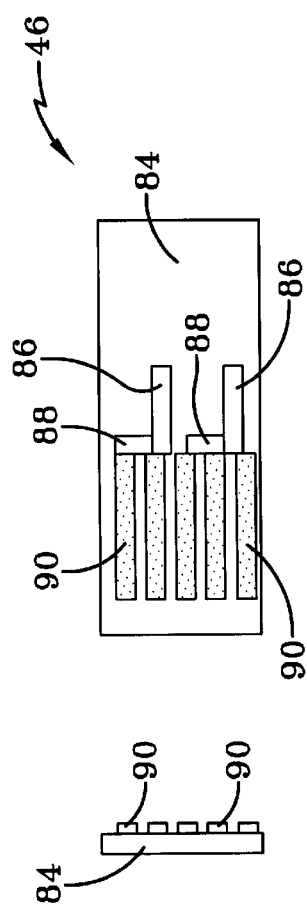
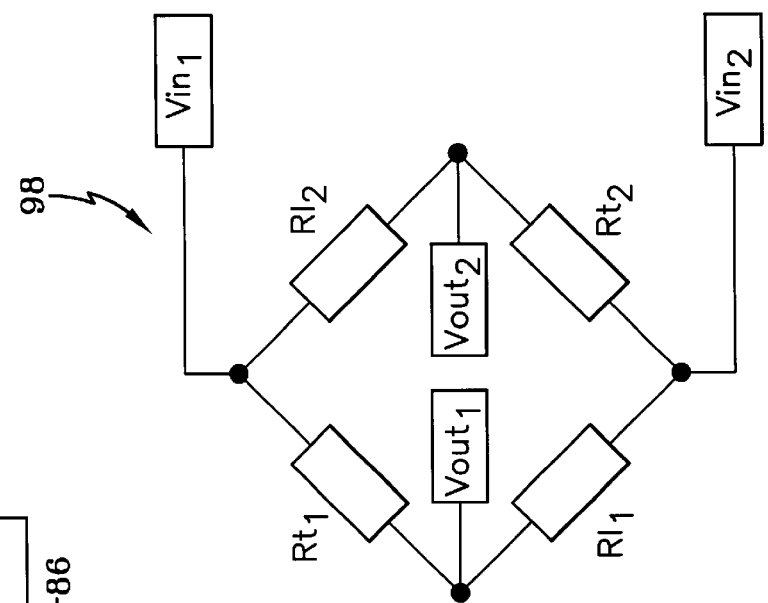
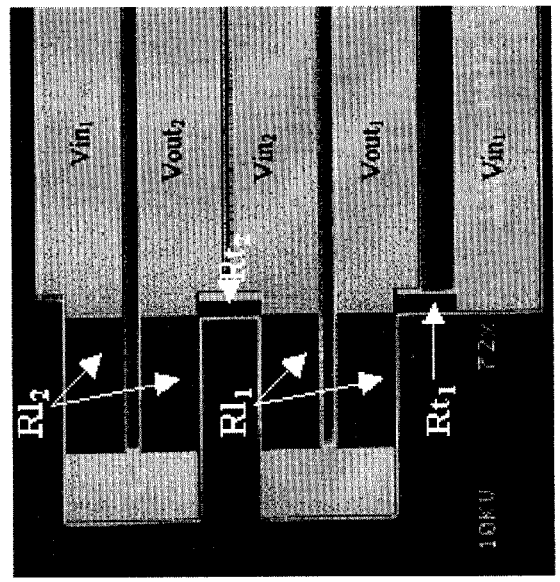
FIG-8
FIG-9
FIG-10
FIG-11

SILICON CARBIDE HIGH TEMPERATURE ANEMOMETER AND METHOD FOR ASSEMBLING THE SAME

ORIGIN OF THE INVENTION

The invention described herein was made by employees of the United States Government and may be manufactured and used by or for the Government or Government purposes without the payment of any royalties thereon or therefore.

TECHNICAL FIELD

In general, the present invention is directed to sensors. In particular, the present invention is directed to high temperature semiconductor sensors. Specifically, the present invention is directed to silicon carbide sensors and packaging sufficient to withstand high vibration and high temperature environments.

BACKGROUND ART

Computer simulations of engine behavioral parameters have led to computerization of the design and production of new turbine engines. With the improvements in sensor technology, engine designs for the purpose of increasing aviation safety, efficient energy management and improved emission control can now be easily obtained. To facilitate this desirable acquisition of information, computer simulations are performed using codes that are generated by Computational Fluid Dynamics (CFD). Results from these codes are useful in determining design changes that should be incorporated into the engine design. It is therefore crucial that these CFD codes be very accurate in predicting the behavior of the engine. Validation of the accuracy of the CFD codes requires the direct measurement of the engines behavioral parameters such as pressure, flow and temperature. Results of these measured parameters are compared against the ones from CFD calculations. Accordingly, by utilizing direct measurement it is believed that further improvement of the codes can be obtained, thereby minimizing errors in simulations and increasing the confidence of using the CFD codes.

Sensor use to measure the conditions inside an engine are currently limited to the low temperature sections wherein low temperature is defined as anything less than 200° C. This limitation makes it difficult and expensive to validate CFD codes generated with respect to the higher temperature sections (>200.° C.). In cases where the high temperature sections are monitored, the results are largely unreliable due to limitations imposed by currently known sensors and the properties of the package material which carry the sensor.

Generally, packaging components have different material properties than the sensors that they carry. As a result of the mismatch created by the differences in the coefficients of thermal expansion for the sensor and its packaging, undesirable transient thermomechanical stresses are induced on the sensor. These stresses lead to creep and fatigue that cause gradual deviation from true measurement and eventual failure of the sensor. It is believed that the current packaging methods lack the required precision placement of a cantilever beam which is used as the sensing component. As a result of the lack of precision alignment, the beam is often misaligned which leads to the introduction of undesirable stresses when the beam is inserted into the flow field. Also, because the beam is not precisely placed on a clamped edge, maximum strain is not transferred to the gauges disposed on the beam leading to reduced sensitivity. The lack of consistency in the placement of the cantilever beam means that readings from one sensor to another will vary. Moreover, the relatively large area of the cantilever beam used in known prior art sensors creates turbulence in the flow field that prevents measurement of actual flow parameters. Additionally, the materials used in currently known packaging, including the sensor, which are generally silicon, are limited to a low temperature environment.

Yet another drawback of existing sensor devices used in high temperature and high vibration environments is that they use wire bonding technologies. The bond wires are suspected to act as antennas that receive spurious electromagnetic noise generated in such an environment. It is believed that this noise interacts with the actual measured signals and causes them to be inaccurate.

SUMMARY OF THE INVENTION

Based upon the foregoing it is therefore a primary object of the present invention to provide a silicon carbide high temperature anemometer and method for assembling the same.

Another object of the present invention, which shall become apparent as the detailed description proceeds, is achieved by a high temperature anemometer, comprising a pair of substrates, one of the substrates having a plurality of electrodes on a facing surface, the other of the substrates having a sensor cavity on a facing surface; and a sensor received in the sensor cavity, the sensor having a plurality of bond pads, wherein the bond pads contact the plurality of electrodes when the facing surfaces are mated with one another.

Other aspects of the present invention are attained by a sensor comprising a housing having a package cavity therethrough; a sensor package received in the housing, the sensor package having a silicon carbide cantilever beam sensor extending outwardly from the housing.

Still another object of the present invention is attained by a method for assembling an anemometer, comprising providing a cantilever beam having a plurality of bond pads on one side thereof providing a first substrate and a second substrate, each substrate being of the same material as the cantilever beam; etching the first substrate with a plurality of trenches and a cavity; passivating both of the substrates; disposing a plurality of electrodes on the second substrate; positioning the cantilever beam in the cavity; positioning a plug-in pin in each of the trenches; and mating the first substrate with the second substrate so that the plug-in pins and the bond pads are in intimate contact with the plurality of electrodes.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 1 is a perspective drawing of a silicon carbide high temperature anemometer according to the present invention in partial cross-section;

FIG. 1A is a schematic drawing of diagnostic equipment that is connected to the anemometer;

FIG. 2 is a top view of a bottom surface of a connection substrate used in the sensor of the present invention;

FIG. 3 is a left end view of the connection substrate;

FIG. 4 is a right end view of the connection substrate;

FIG. 5 is a top view of a top surface of a cavity substrate used in the sensor of the present invention;

FIG. 6 is an elevational cross-sectional view of the substrates mated to one another taken along lines 6—6 of FIG. 1;

FIG. 7 is an another cross-sectional view of the substrates mated to one another taken along lines 7—7 of FIG. 1;

FIG. 8 is a top elevational view of a cantilever beam sensor used in the present invention;

FIG. 9 is a left end view of the cantilever beam sensor;

FIG. 10 is an enlarged micro photograph showing the beam sensor;

FIG. 11 is an electrical schematic diagram showing a Wheatstone bridge configured on the beam sensor;

BEST MODE FOR CARRYING OUT THE INVENTION

Figure 12:
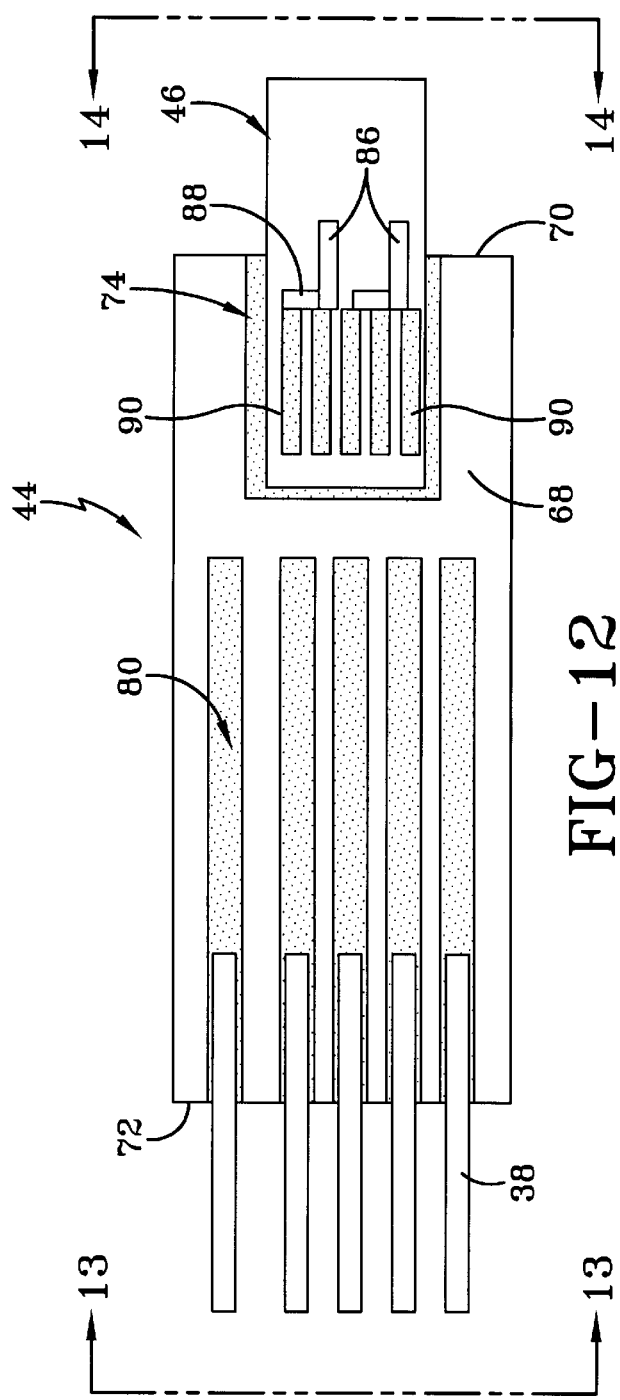
FIG. 12 is a top elevational view of the cantilever beam plug-in pins installed into the bottom substrate of the present invention.

Referring now to the drawings and in particular FIG. 1, it can be seen that a silicon carbide high temperature anemometer is designated generally by the numeral 10. Generally, the anemometer 10 is assembled to withstand high temperature, high turbulence, and high vibrations that a turbine engine may be subject to or any environment where similar conditions are encountered.

The anemometer 10 includes a housing 12 which is preferably constructed of stainless steel. It will be appreciated that the housing could be made of any other like material able to withstand temperatures up to about 600° C. and potentially corrosive media. The housing 12 includes a body 14 which is for the most part a cylindrical construction. The body 14 has a sensor end 16 opposite an output end 18. The output end 18 includes a collar 20 which has a diameter that is reduced from the diameter of the body 14. A taper 22 may be provided at the sensor end 16 to allow for insertion into a turbine engine wall or the like and to minimize package interference with the engine's flow field. It will be appreciated that the sensor end 16 could be configured so as to enable mating with any shaped opening in the device that is to be monitored. At a side substantially opposite the taper 22, the body 14 provides a plurality of bores 26, each of which extends into a threaded counter-bore 28. Although three bores and corresponding counter-bores are shown, it will be appreciated that any number of bores could be used. Extending throughout the body 14 is a package cavity 30 which in this embodiment is preferably substantially rectangular. Received within the package cavity 30 is a stainless steel shim 32 and a sensor package 36. Preferably the shim material is stainless steel which is the same material used for the housing 12. If desired, a different material could be used for the functional purpose of providing compatible coefficients of thermal expansion (CTE) between the sensor package 36 and the stainless steel housing. Whatever materials are selected, the shim 32 must have a CTE greater than the housing to maintain the integrity of the sensor package's electrical connection. In any event, it is preferred that the shim 32 be the same material as used for the housing 12. Extending from the sensor package 36, at the output end 18, are a plurality of plug-in pins 38. A plurality of fasteners 40, preferably made of stainless steel, are received within in each of the bores 26 and counter-bores 28 to hold the shim 32 and sensor package 36 securely within the body 14.

Figure 14:
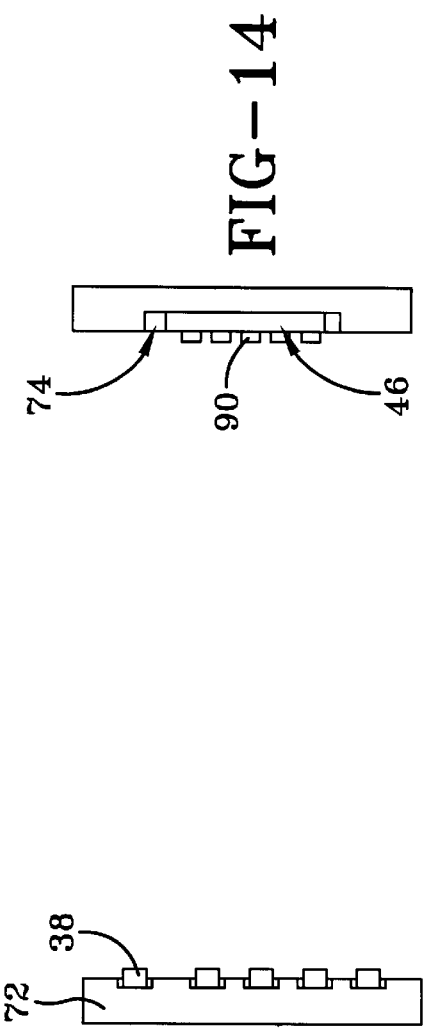
FIG. 14 is a right end view of FIG. 12.
Figure 13:
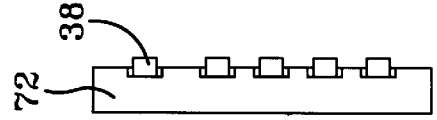
FIG. 13 is a left end view of FIG. 12.

As best seen in FIGS. 2–9 and 12–14, the sensor package 36 provides a connection substrate 42 which functions as the top half of the sensor package and a cavity substrate 44 which functions as the bottom half of the package 36. A cantilever beam 46 is captured between the substrates 42 and 44 and extends outwardly from the sensor end 16 of the housing 12. Although the substrates 42 and 44 are of the same size and thickness in the preferred embodiment it will be appreciated that varying thicknesses and dimensions of the substrates could be used. However, it is believed to be more efficient and cost effective to use substrates of substantially equal size and shape.

The anemometer 10 is preferably installed in an engine wall such that the cantilever beam 46 is the only element that extends into an engine cavity formed by the engine wall. It is believed that the anemometer 10 is capable of sensing turbulence intensity in a gas flow field as hot as 600° C. due to the packaging methodology—which will be described in detail—and the materials selected.

Referring now to FIGS. 2–4, 6 and 7 the details of the connection substrate 42 and the cavity substrate 44 are shown. Both of the substrates are manufactured from polycrystalline silicon carbide which is able to withstand the high temperatures and high vibrations for the anemometer's end use. An alternative to the silicon carbide material is aluminum nitride. Whatever material is selected it should have thermo-mechanical properties similar to that of silicon carbide. As is common with the manufacture of silicon wafers, the silicon carbide substrates are manufactured in batches and diced or cut into separate pieces. Preferably, the substrates 42, 44 have a thickness of about 30 mils. Afterwards, a long thermal oxidation process follows to passivate the surfaces from conducting electrically. The batch processing ensures uniformity in pieces and ultimately in the readings generated by the sensor package.

As best seen in FIGS. 2–4, the connection substrate 42 includes a sensor end 54 and a pin end 56. The connection substrate 42 provides a mate surface 58 which extends from the sensor end 54 to the pin end 56. A plurality of trans-connect electrodes 60 are disposed on the mate surface 58. These electrodes are high temperature trans-connecting thin film metallization lines that start from the sensor end 54 and widen equidistantly as they extend to the pin end 56. In particular, the electrodes 60 provide a plurality of fingers 62 which start at the sensor end 54, but which are not flush with that end as seen in FIG. 2. These thin fingers 62 extend to a transition section 64 which further extend to a plurality of wide end contacts 66 which extend all the way and are preferably flush with the pin end 56. Although five electrodes are shown on the mate surface 58 it will be appreciated that any number of electrodes and appropriate shapes of the electrodes may be employed depending upon the particular sensor which is sandwiched between the connection substrate 42 and the cavity substrate 44. In any event, the thickness of the electrodes is preferably about 0.6 microns.

Referring now to FIGS. 5–7 the cavity substrate 44 is shown. The substrate 44 includes a sensor end 70 and a pin end 72 and provides a mate surface 68. Provided at the sensor end 70 is a sensor cavity 74 which is substantially rectangular in shape and medially disposed between the edges of the substrate. The sensor cavity 74 includes cavity sides 76 and a cavity bottom 78. Extending from the pin end 72 toward the sensor cavity 74, but not contiguous with the sensor cavity, are a plurality of trenches 80. These trenches 80 extend lengthwise and are spaced apart from each other. Formation of the sensor cavity 74 and the trenches 80 is accomplished by deep reactive ion etching which allows for micro-scale precision micro-machining and further batch fabrication of the substrates 42, 44. The length, the width, and depth of each trench 80 is the same within a few microns of each other. The depth of the cavity 74 of each substrate is the same as the depth of the trenches which is preferably about 300 microns and matches to within a few microns so that consistent precision placement of the cantilever beam sensor 46 in the cavity 74, from sensor to sensor, is assured. Moreover, the depth of the cavity and the trenches are preferably a few microns less than the thickness of the cantilever beam 46. Accordingly, when the cantilever beam 46 is placed into the cavity 74, the beam is a few microns non-planar with the mate surface 68.

Referring now to FIGS. 8–11, it can be seen that the cantilever beam sensor is designated generally by the numeral 46. Sensor 46 includes a beam substrate 84 which is preferably made of a single crystalline silicon carbide material. In particular, the beam substrate 84 is a p-type single crystal silicon carbide substrate. An n-type single crystal epilayer is grown on the p-type substrate so as to form four photo-lithographically defined and patterned silicon carbide strain gauges. As with the substrates 42, 44, the beam sensor 46 may be made by a batch processing technique. An alternative to the silicon carbide material is aluminum nitride. Whatever material is selected it should have thermo-mechanical properties similar to that of silicon carbide. Another alternative to forming the substrates and the sensors is to use a compression molding technique. In any event, a pair of longitudinal piezoresistor gauges 86, designated as $R1_1$ and $R1_2$, in FIGS. 10 and 11, are disposed partially lengthwise on the substrate. A corresponding number of transverse piezoresistor gauges 88, which are designated as $Rt_1$ and $Rt_2$, are also provided on the substrate. The gauges 86 and 88 are preferably configured in a Wheatstone bridge circuit configuration 98 as best seen in FIGS. 10 and 11. Connected to the gauges 86 and 88 are a plurality of bondpads 90 which further extend lengthwise along the beam substrate 84 and preferably have a thickness of about 0.6 microns.

Referring now to FIGS. 5–7 and 12–14, assembly of the sensor package 36 will now be discussed. After completion of the construction of the substrates 42,44 and 46, the cantilever beam 46 is slid into and is frictionally engaged by the cavity sides 76 of the cavity 74 and attached to the cavity base 78 by using a high temperature non-conductive glass attaching material so that only the longitudinal gauges 86 overhang the edge of the cavity base as shown in FIG. 10, while the transverse gauges 88 lie inside the base of the cavity.

Once the beam 46 is positioned in the cavity 74, a plug-in pin 38 is placed in each one of the trenches 80. An appropriate length of the plug-in pin 38 extends out the pin end 72. If desired, the pins may be held frictionally within the trenches or they may be bonded in the same manner as was the beam 46 in the cavity 74. In any event, once the beam 46 and pins 38 are properly installed, the mate surface 58 of the connection substrate 42 is positioned so as to contact the mate surface 68. Since the substrates are preferably of equivalent shape and size they are mated with one another so that the edges of the substrates are flush with one another. Accordingly, the electrodes 60 are properly aligned with the bondpads 90 and the pins 38. In particular, each finger 62 is aligned with a corresponding bondpad 90. Likewise, each wide end contact 66 comes in contact with a corresponding pin 38. In view of the beam and the bondpads, and the pins being of slightly larger thickness than the depth of the cavity and the trenches, respectively, the bond pads and the pins each extend a minimal amount above the surface of the substrate 44. Accordingly, when the surfaces 58, 68 are mated, the electrodes 60 make intimate contact with a corresponding plug-in pin and bondpad.

Once this sub-assembly is complete, the sub-assembled unit is slid into the cavity 30. The width of the package cavity 30 is minimally wider than the sensor package 36 so that alignment of the sensor package's components are not compromised upon receipt in the body 14. Once properly positioned so that the ends 54, 70 of the substrates are flush or slightly recessed from the sensor end 16, while still allowing the cantilever beam 46 to extend beyond the sensor end 16, the fasteners 40 are inserted into the counter-bores so as to contact the shim 32 that is placed between the sensor package 36 and the ends of the fasteners 40. Accordingly, application of a tightening force to the fasteners 40 is transferred to the shim 32 which evenly distributes the holding forces about the sensor package 36. With this placement, the unclamped tip section of the cantilever beam 46 is the only part that is exposed into the flow stream of an engine cavity since the housing 12 is preferably mounted flush against the engine wall. As will be appreciated, when the beam 46 is deflected at the end extending from the substrates 42, 44, only the longitudinal gauges 86 are strained with the maximum strain occurring at the clamped edge, but the transverse gauges residing in the cavity base are unstrained inside the cavity. Of course, if the need arises, the transverse gauges may extend beyond the clamped edge. The pins 38 are then preferably attached to a piece of diagnostic equipment 96, as seen in FIG. 1A, for the purpose of evaluating the readings generated by the anemometer 10.

In operation, the face of the cantilever beam is placed perpendicular to the flow stream. The cantilever beam is deflected in direct proportion to the force induced by the flow velocity. The maximum strain on the beam occurs at the clamped edge of the top and bottom substrates. The induced strain is transferred to the longitudinal gauges, which changes in resistance and is read out externally at the output of the Wheatstone bridge. If desired, the probe-head can also be attached to a longer probe tube to provide flexible insertion into otherwise inaccessible areas.

Based upon the foregoing, the advantages of the present invention are readily apparent. The anemometer 10 is packaged in such a way so that it is semi-enclosed. The method of assembly is advantageous in that it uses a compression-bond technique that essentially eliminates the need for wire-bonding and the reliability problems associated therewith. The construction of the present invention is also advantageous in that it makes it possible to exist as a stand-alone product and to have a plug-and-play capability. Microsensors and integrated microsystems that simultaneously sense flow, pressure, temperature, and vibration can be packaged using this method, which is believed to be more robust than conventional wire-bonding techniques.

Still yet another advantage of the present invention is that the use of high precision batch micromachining to fabricate the substrates make the placement of the cantilever beam consistent and precise from device to device. This translates to consistency in the results obtained from these types of sensors among a family of devices and, as such, the sensor values of the anemometer should be repeatable thus providing consistency to the Computational Flow Dynamic codes that are so valuable in designing and evaluating engine performance.

Still yet another advantage of the present invention is that the anemometer disclosed herein is re-useable by detaching the sensor package from the body 12. The cantilever beam and the enclosing substrates are made of chemical vapor deposited silicon carbide. Since similar materials are used in construction of the package 36 they exhibit the same material properties, such as thermal expansion, therefore problems associated with material mismatch that is prevalent in prior art sensor devices do not exist or are significantly reduced. It is believed that such packaging is equally applicable to other sensors that are used for temperature sensors, pressure sensors and high temperature control electronics. Such an integrated system will allow the use of a single probe to measure the three parameters required for total flow characterization: pressure; temperature; and flow. Moreover, because of the excellent thermomechanical properties of silicon carbide and the fairly large gauge factor of its piezoresistors, the probe can be inserted into sections of an engine otherwise impossible with prior art silicon devices. Yet a further advantage of the present invention is that the self-alignment between the electrode and bondpads and between electrodes and the plug-in pins eliminates the need for bondwires, thereby eliminating the associated reliability problems encountered with wirebonding at high temperature and extreme vibrations.

Yet a further advantage of the present invention is that such sensors can be inserted permanently into an engine as part of an overall health monitoring strategy. It is believed that such devices can be manufactured in enough volume to make them cost competitive with other similar type sensors.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A high temperature anemometer, comprising:
   a pair of substrates, one of said substrates having a plurality of electrodes, the other of said substrates having a sensor cavity; and
   a sensor received in said sensor cavity, said sensor having a plurality of bond pads, wherein said bond pads contact said plurality of electrodes when said substrates are mated with one another.

2. The anemometer according to claim 1, further comprising a plurality of plug-in pins, wherein the other of said substrates has a plurality of trenches for receiving said plurality of plug-in pins, wherein said plurality of plug-in pins contact said plurality of electrodes when said substrates are mated with one another.

3. The anemometer according to claim 1, wherein said sensor has a Wheatstone bridge circuit connected to said bond pads.

4. The anemometer according to claim 3, wherein said Wheatstone bridge circuit comprises longitudinal gauges and transverse gauges.

5. The anemometer according to claim 4, wherein said sensor cavity is at an end of one of said substrates such that said sensor partially extends from said substrate, and wherein said transverse gauges are between said substrates and said longitudinal gauges extend beyond said substrates.

6. The anemometer according to claim 4, wherein said sensor comprises p-type silicon carbide, and said longitudinal and said transverse gauges comprise n-type silicon carbide.

7. The anemometer according to claim 1, wherein said sensor and said substrates are made of similar material.

8. The anemometer according to claim 7, wherein said sensor and said substrates are made of silicon carbide.

9. The anemometer according to claim 2, wherein said plurality of trenches and said sensor cavity are of substantially an equivalent depth, and wherein said plurality of plug-in pins, and said sensor with said bond pads are of substantially an equivalent thickness, wherein said thickness is greater than said depth such that said electrodes make intimate contact with said bond pads and said plurality of plug-in pins when said substrates are mated with one another.

10. A sensor comprising:
    a housing having a package cavity therethrough;
    a sensor package received in said package cavity, said sensor package having a silicon carbide cantilever beam sensor extending outwardly from said housing, wherein said sensor package comprises:
    a connection substrate having a plurality of electrodes disposed on one side thereof;
    a cavity substrate having a sensor cavity for receiving said silicon carbide beam sensor, and a plurality of trenches; and
    a plurality of pins, each received in a corresponding one of said plurality of trenches;
    said silicon carbide beam sensor having a plurality of bond pads, wherein said connection substrate and said cavity substrate are mated with one another so that said plurality of electrodes connect said plurality of pins to said plurality of bond pads.

11. The sensor according to claim 10, wherein said housing has at least one bore for receiving a fastener to secure said sensor package within said package cavity.

12. The sensor according to claim 11, further comprising:
    a shim received in said package cavity and interposed between said fastener and said sensor package.

13. The sensor according to claim 12, wherein said shim has at least a coefficient of thermal expansion greater than that of said housing.

14. The sensor according to claim 13, wherein said shim and said housing are made of stainless steel.

15. The sensor according to claim 12, wherein said housing and said shim are made of dissimilar materials, and wherein said shim's coefficient of thermal expansion is at least greater than said housing's coefficient of thermal expansion.

* * * * *